(12) United States Patent
Shin

(10) Patent No.: US 7,961,356 B2
(45) Date of Patent: Jun. 14, 2011

(54) IMAGE PROCESSING APPARATUS INCLUDING ADJUSTABLE SHADING PROFILE AND SHADING METHOD THEREOF

(75) Inventor: Jeong-hwan Shin, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 678 days.

(21) Appl. No.: 12/014,235

(22) Filed: Jan. 15, 2008

(65) Prior Publication Data

US 2008/0309990 A1 Dec. 18, 2008

(30) Foreign Application Priority Data

Jun. 12, 2007 (KR) .................. 10-2007-0057472

(51) Int. Cl.
*H04N 1/407* (2006.01)

(52) U.S. Cl. ............ 358/3.21; 358/3.23; 358/3.26; 358/516; 358/461

(58) Field of Classification Search .......... 358/1.9, 358/3.01, 3.21, 3.23, 3.26, 3.27, 505, 516, 358/518–521, 523, 461, 474; 382/274; 348/241, 348/243, 251, 254–256; 356/402, 404, 421, 356/422

See application file for complete search history.

(56) References Cited

U.S. PATENT DOCUMENTS

| | | | | |
|---|---|---|---|---|
| 4,783,836 A * | 11/1988 | Takashima | ........... | 382/274 |
| 5,412,489 A * | 5/1995 | Hirota | ........... | 358/461 |
| 5,500,745 A * | 3/1996 | Iishiba et al. | ........... | 358/461 |
| 5,926,563 A * | 7/1999 | Yamazaki | ........... | 358/521 |
| 5,929,417 A * | 7/1999 | Hayashi et al. | ........... | 348/254 |
| 5,999,206 A * | 12/1999 | Inoue et al. | ........... | 358/3.23 |
| 6,072,912 A * | 6/2000 | Orito | ........... | 382/274 |
| 6,075,621 A * | 6/2000 | Takeuchi et al. | ........... | 358/461 |
| 6,631,209 B1 * | 10/2003 | Kanamori | ........... | 358/461 |
| 6,753,987 B1 * | 6/2004 | Farnung et al. | ........... | 358/518 |
| 7,006,668 B2 * | 2/2006 | Iguchi et al. | ........... | 382/274 |
| 7,259,892 B2 * | 8/2007 | Nakajima | ........... | 358/1.9 |
| 7,450,776 B2 * | 11/2008 | Koyama et al. | ........... | 382/274 |
| 7,483,064 B2 * | 1/2009 | Hattori | ........... | 348/254 |
| 2007/0223064 A1 * | 9/2007 | Ichitani | ........... | 358/461 |

FOREIGN PATENT DOCUMENTS

KR 2003-79284 10/2003

* cited by examiner

*Primary Examiner* — Scott A Rogers
(74) *Attorney, Agent, or Firm* — Stanzione & Kim, LLP

(57) ABSTRACT

Embodiments of image processing apparatuses and methods according to the present general inventive concept may generate and/or store shading profile information based on an image characteristic relative to a prescribed condition of that characteristic such as according to brightness equal to or above a prescribed (e.g., minimum or lower) brightness level or the like. An embodiment of an image processing apparatus according to the present general inventive concept may include a scanning unit to scan an inputted image and an image processor to process the inputted image based on shading profile information determined according to brightness equal to or above a minimum brightness level.

26 Claims, 5 Drawing Sheets

IMAGE PROCESSING APPARATUS INCLUDING ADJUSTABLE SHADING PROFILE AND SHADING METHOD THEREOF

CROSS-REFERENCE TO RELATED APPLICATIONS

This application claims priority from Korean Patent Application No. 10-2007-0057472, filed on Jun. 12, 2007 in the Korean Intellectual Property Office, the disclosure of which is incorporated herein by reference.

BACKGROUND OF THE INVENTION

1. Field of the Invention

Apparatuses and methods consistent with the present general inventive concept relate to an image processing apparatus and a shading method thereof, and more particularly, to an image processing apparatus to process an image with stored shading information and a shading method thereof.

2. Description of the Related Art

An image processing apparatus processes an inputted image. The image processing apparatus includes an image light sensor to scan the inputted image. If physical properties of the image light sensor change with time, the scanned image may be distorted. Adjusting such a distorted image is called shading.

The shading operation is performed to generate shading profile information by scanning the inputted image. The shading profile information is generated by photoelectrically transforming the scanned inputted image into an analog signal and then the analog signal into a voltage signal. The number of the image light sensor is equivalent to that of pixels. The shading profile information is generated according to the number of the pixels.

A related art image processing apparatus includes a memory to store the shading profile information therein. FIG. 1 illustrates white shading profile information that is distributed in RGB channels. As illustrated in FIG. 1, while the shading profile information is distributed in a particular part instead of the overall region corresponding to the size of the memory, the memory is unnecessarily large in storing the shading profile information.

SUMMARY OF THE INVENTION

The present general inventive concept provides an image processing apparatus and a shading method thereof to store shading profile information.

The present general inventive concept also provides an image processing apparatus and a shading method thereof to store shading profile information to reduce a capacity of a memory storing shading profile information.

The present general inventive concept also provides an image processing apparatus and a shading method thereof to store shading profile information of brightness above or equal to a minimum brightness level to reduce a capacity of a memory storing shading profile information.

The present general inventive concept also provides an image processing apparatus that differently stores shading profile information depending on brightness of a scanned image (e.g., reference), and adjusts a shade of an input image efficiently, and a shading method thereof.

Additional aspects and/or utilities of the present general inventive concept will be set forth in part in the description which follows and, in part, will be obvious from the description, or may be learned by practice of the present general inventive concept.

The foregoing and/or other aspects and utilities of the present general inventive concept may be achieved by providing an image processing apparatus including a scanning unit to scan an inputted image, a storage unit, an image processor to process the inputted image and a controller to store the shading profile information in the storage unit according to brightness equal to or above a minimum brightness level, to generate adjusted shading profile information by reflecting the minimum brightness level in the stored shading profile information as an offset, and to control the image processor to process the inputted image based on the adjusted shading profile information.

The storage unit may include a first storage unit to store black shading profile information and a second storage unit to store white shading profile information.

The shading profile information may be stored per line according to brightness equal to or above a minimum brightness level.

The controller may divide the line into a plurality of preset regions, and the shading profile information may be stored for each of the plurality of regions according to the brightness.

The shading profile information may be stored according to RGB channels.

The foregoing and/or other aspects and utilities of the present general inventive concept may also be achieved by providing a shading method of an image processing apparatus including scanning an inputted image, storing shading profile information according to brightness equal to or above a minimum brightness level, generating adjusted shading profile information by reflecting the minimum brightness level in the stored shading profile information as an offset and processing the inputted image based on the adjusted shading profile information.

Storing the shading profile information may include respectively storing black shading profile information and white shading profile information.

Storing the shading profile information may include storing the shading profile information per line.

Storing the shading profile information may include dividing the line into a plurality of preset regions and storing the shading profile information of the plurality of regions according to brightness.

Storing the shading profile information may include storing the shading profile information according to RGB channels.

The foregoing and/or other aspects and utilities of the present general inventive concept may also be achieved by providing an image processing apparatus comprising a scanning unit to scan an inputted image and a controller to process the inputted image using adjusted shading profile information stored according to a prescribed non-zero brightness level.

The foregoing and/or other aspects and utilities of the present general inventive concept may also be achieved by providing a shading method of an image processing apparatus comprising storing shading profile information according to a brightness relationship to a prescribed brightness level to reduce a storing capacity adapted to store the shading profile information.

The foregoing and/or other aspects and utilities of the present general inventive concept may also be achieved by providing a computer readable medium having stored thereon instructions for use with an image forming apparatus, the instructions comprising first instructions for scanning an inputted image, second instructions for storing shading profile information according to a brightness level above a prescribed lower brightness level, third instructions for generating adjusted shading profile information by incorporating the prescribed lower brightness level in the stored shading profile information and fourth instructions for processing the inputted image based on the adjusted shading profile information.

BRIEF DESCRIPTION OF THE DRAWINGS

The above and/or other aspects of the present general inventive concept will become apparent and more readily appreciated from the following description of the embodiments, taken in conjunction with the accompanying drawings of which.

DETAILED DESCRIPTION OF EMBODIMENTS

Figure 1:
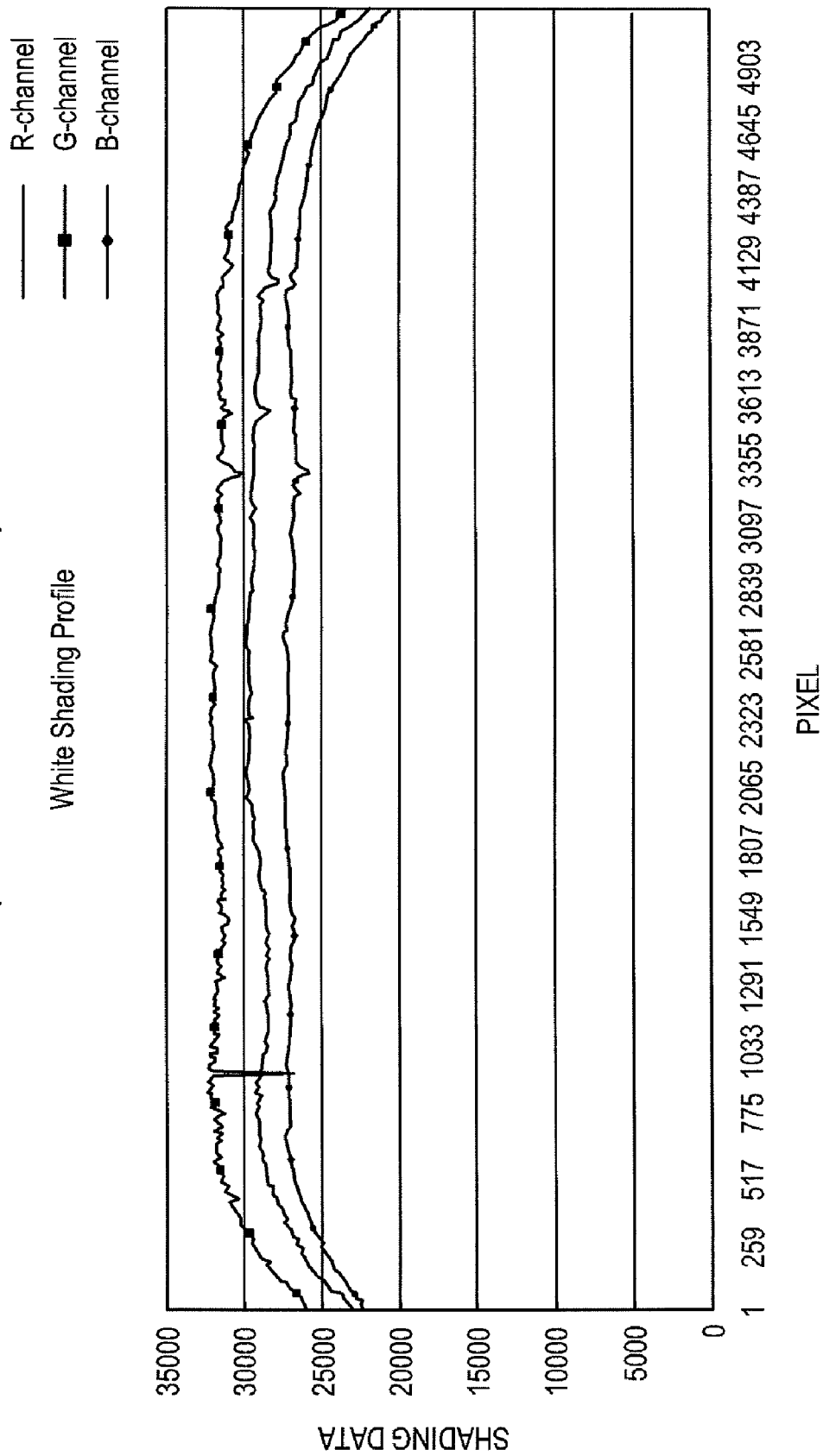
FIG. 1 illustrates a distribution of shading profile information stored in a related art image processing apparatus.

Reference will now be made in detail to embodiments of the present general inventive concept, examples of which are illustrated in accompanying drawings, wherein like reference numerals refer to like elements throughout. The embodiments are described below in order to explain the present general inventive concept by referring to the figures.

Figure 2:
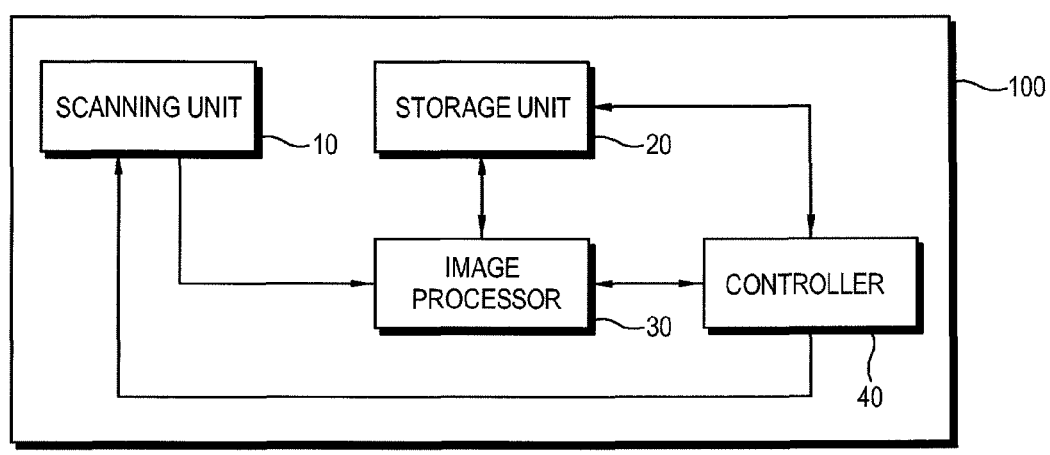
FIG. 2 is a block diagram that illustrates an image processing apparatus according to an exemplary embodiment of the present general inventive concept.

FIG. 2 is a block diagram that illustrates an image processing apparatus 100 according to the present general inventive concept. As illustrated in FIG. 2, the image processing apparatus 100 according to an exemplary embodiment of the present general inventive concept includes a scanning unit 10, a storage unit 20, an image processor 30 and a controller 40. The image processing apparatus 100 according to the exemplary embodiment of FIG. 2 may include a scanner, a multi function peripheral (MFP) or the like.

The scanning unit 10 scans an inputted image. The scanning unit 10 according to the present general inventive concept may use a charge coupled device (CCD), an array contact image sensor (CIS), a non array CIS, a photo sensor, or the like.

The storage unit 20 stores shading profile information according to brightness of the image scanned by the scanning unit 10. The storage unit 20 according to embodiments of the present general inventive concept includes a memory for example, a flash memory, which is a nonvolatile memory.

Generally, the shading profile information is classified as white shading profile information and black shading profile information. The white shading profile information and black shading profile information are equal in size and may be respectively stored in separate memories.

The shading profile information may be generated at the time of manufacturing, repeatedly, periodically, according to user actions, with an initial input image of a series of images, with each input image or the like. The shading profile information may be generated based on conditions at the image processing apparatus or detected in images processed by the image processing apparatus or the like.

The shading profile image information may be generated using a test or reference image or portion thereof, a test or reference area of a scanning unit or portion thereof, an input image or portion thereof, empirical data or the like. Further, the shading profile information may be include actual or processed data from the test or reference image or portion thereof, a test or reference area of a scanning unit, empirical data, or the like.

The image processor 30 is configured to process the inputted image scanned by the scanning unit 10 based on the shading profile information stored in the storage unit 20. The image processor 30 according to embodiments of the present general inventive concept may adjust shades of an image based on the shading profile information, and also perform general processing operations to process the scanned inputted image to be outputted as a predetermined image.

The controller 40 may control storing of the shading profile information (e.g., of the inputted reference image) scanned by the scanning unit 10 in the storage unit 20 according to brightness equal to or above a minimum brightness level, and generate adjusted shading profile information by reflecting the minimum brightness level to the stored shading profile information of the inputted image (e.g., as an offset). The controller 40 can control the image processor 30 to process the inputted image according to the adjusted shading profile information.

The controller 40 according to the present general inventive concept may further include logic circuits such as a subtractor 42 and a divider 44 to perform the shading adjustment. A controller (e.g., controller 40) according to one embodiment of the present general inventive concept will be described in detail with reference to FIG. 4.

Figure 3:
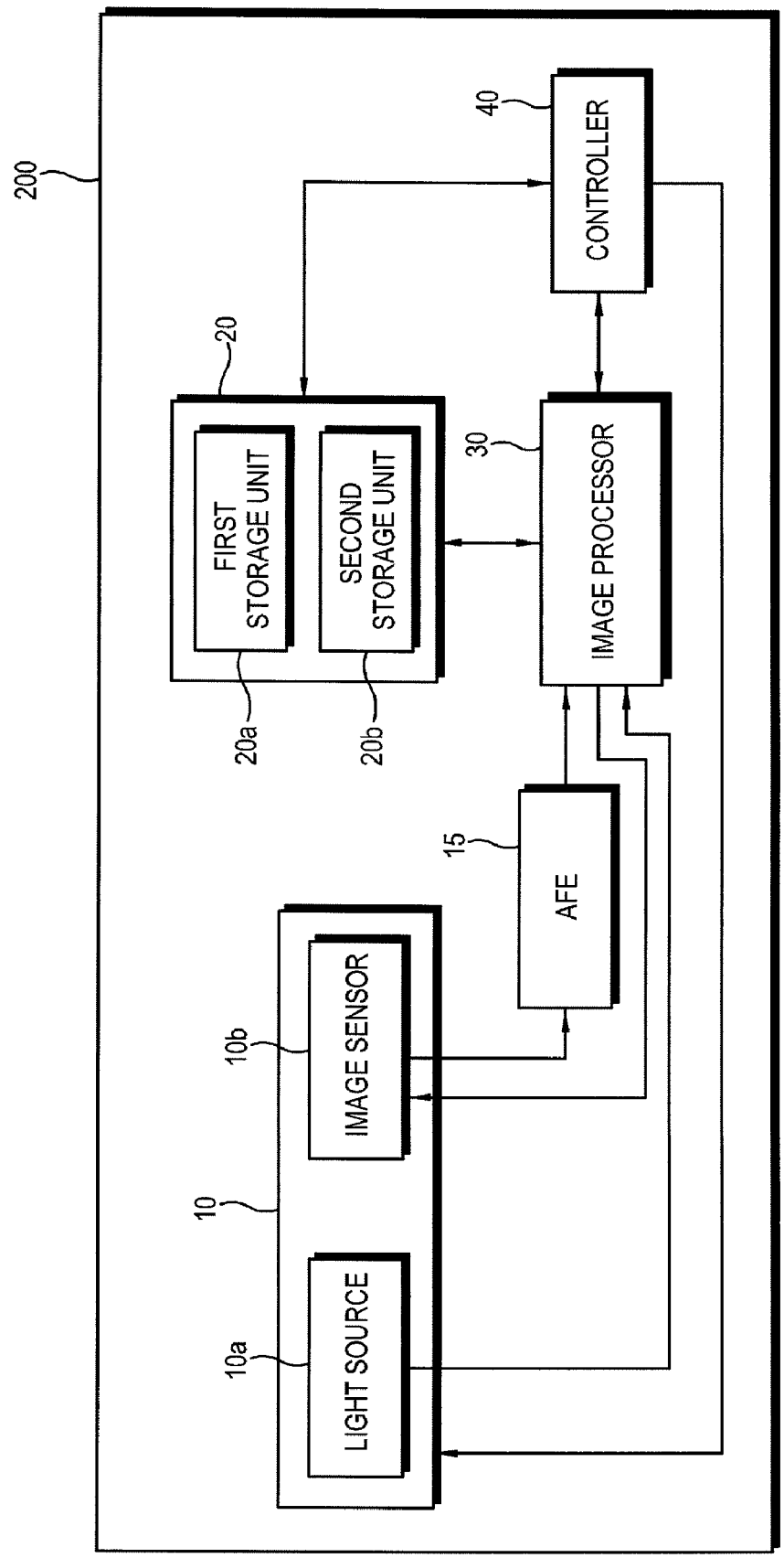
FIG. 3 is a block diagram that illustrates an image processing apparatus according to another exemplary embodiment of the present general inventive concept.

An image processing apparatus 200 according to another exemplary embodiment of the present general inventive concept will be described with reference to FIG. 3. As illustrated in FIG. 3, the image processing apparatus 200 according to the present general inventive concept includes a scanning unit 10 that has a light source 10a and an image sensor 10b and an analog front end (AFE) 15, and a storage unit 20 that may have a first storage unit 20a and a second storage unit 20b therein.

If the light source 10a of the scanning unit 10 emits light to an inputted image, the light is reflected in the inputted image and transmitted to the image sensor 10b through an optical element such as a lens and a mirror. Then, the image sensor 10b receives the light reflected from the inputted image and converts it into an analog voltage to be supplied to the AFE 15.

The AFE 15 converts the analog voltage inputted by the image sensor 10b into digital data.

The first storage unit 20a may store white shading profile information of (e.g., scanned) the scanning unit 10, according to brightness equal to or above a minimum brightness level. The second storage unit 20b may store black shading profile information of (e.g., scanned) the scanning unit 10 according to brightness equal to or above a minimum brightness level. The controller 40 may store the shading profile information according to brightness equal to or above the minimum brightness level only, in the first and second storage units 20a and 20b. Thus, the capacity of the first and second storage units 20a and 20b, which store the shading profile information, may be reduced.

The controller 40 may scan lines of the inputted image, and to store the shading profile information in the first and second storage units 20a and 20b corresponding thereto. The controller 40 may divide a single line of the inputted image into preset regions and to store the shading profile information corresponding thereto. For example, in case of 720 dpi resolution, the controller 40 may store the shading profile information in the storage unit 20 through dividing a region of the inputted image into 36-dot or 72-dot unit, and generate the adjusted shading profile information for use with an inputted image according to the region.

The controller 40 may control (e.g., store) the shading profile information according to RGB channels.

The controller 40 may control the image processor 30 to adjust shades with respect to the data (e.g., digital image input data converted, for example, by the AFE 15) based on the shading profile information stored in the first and second storage units 20a and 20b. An example of a process of generating the adjusted shading information and performing the shading adjustment according to the present general inventive concept will be described with reference to FIG. 4.

First, the controller 40 may set the minimum brightness level (e.g., of the inputted reference image) scanned by the scanning unit 10 as the offset. For example, the controller 40 may set the respective minimum brightness level of the inputted scanned image as white and black offsets with respect to the white shading profile information and the black shading profile information, and store the white shading profile information in the first storage units 20a and the black shading profile in the second storage units 20b respectively according to brightness equal to or above the minimum brightness level.

According to embodiments of the present general inventive concept, the shading control information may be determined or stored according to brightness equal to or above the minimum brightness level. However, the present general inventive concept is not intended to be limited by this exemplary disclosure. For example, the shading control information may be determined or stored according to brightness based on (e.g., above, below or not less than, etc.) a lower brightness level, an upper brightness level, a maximum brightness level, a prescribed brightness level or plurality of prescribed brightness levels. According to embodiments of the present general inventive concept the shading control information may be stored (e.g., accurately) using reduced memory capacity and available for use (e.g., to adjust) with subsequent image data.

The controller 40 may process the black shading profile information stored in the first storage unit 20a and the white shading profile information stored in the second storage unit 20b to generate adjusted shading profile information. Such adjusted shading profile information may be used with input image data. For example, the controller 40 may reflect (e.g., combine) the black offset in the black shading profile information stored in the first storage unit 20a and the white offset in the white shading profile information stored in the second storage unit 20b. The controller 40 may input adjusted shading profile information to the first and second subtractors 42a and 42b to subtract the data converted by the AFE 15.

Figure 4:
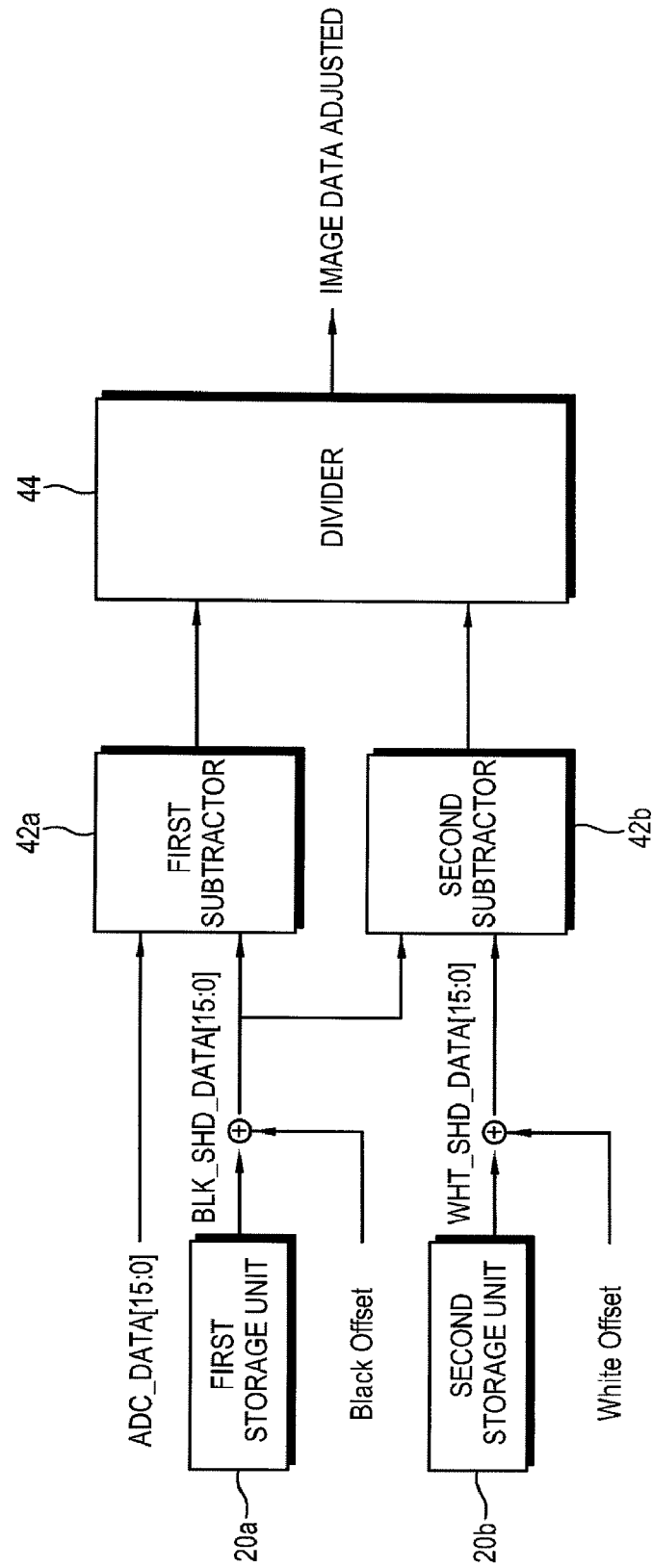
FIG. 4 illustrates an exemplary process of generating adjusted shading profile information by the image processing apparatus according to the present general inventive concept.

The controller 40 may control the divider 44 to divide the data subtracted by the subtractors 42a and 42b to generate the adjusted image data. As illustrated in FIG. 4, a example Formula 1 to calculate the adjusted image data is as follows. ADCDATA is digital data transformed by analog to digital converting (e.g., AFE 15) and, BLKSHDDATA and WHTSHDDATA are the black shading profile information and the white profile information (e.g., input to the subtractors 42a, 42b) respectively.

$$\text{Image data adjusted for shading} = \frac{ADCDATA - BLKSHDDATA}{WHTSHDDATA - BLKSHDDATA}$$

[Formula 1]

Figure 5:
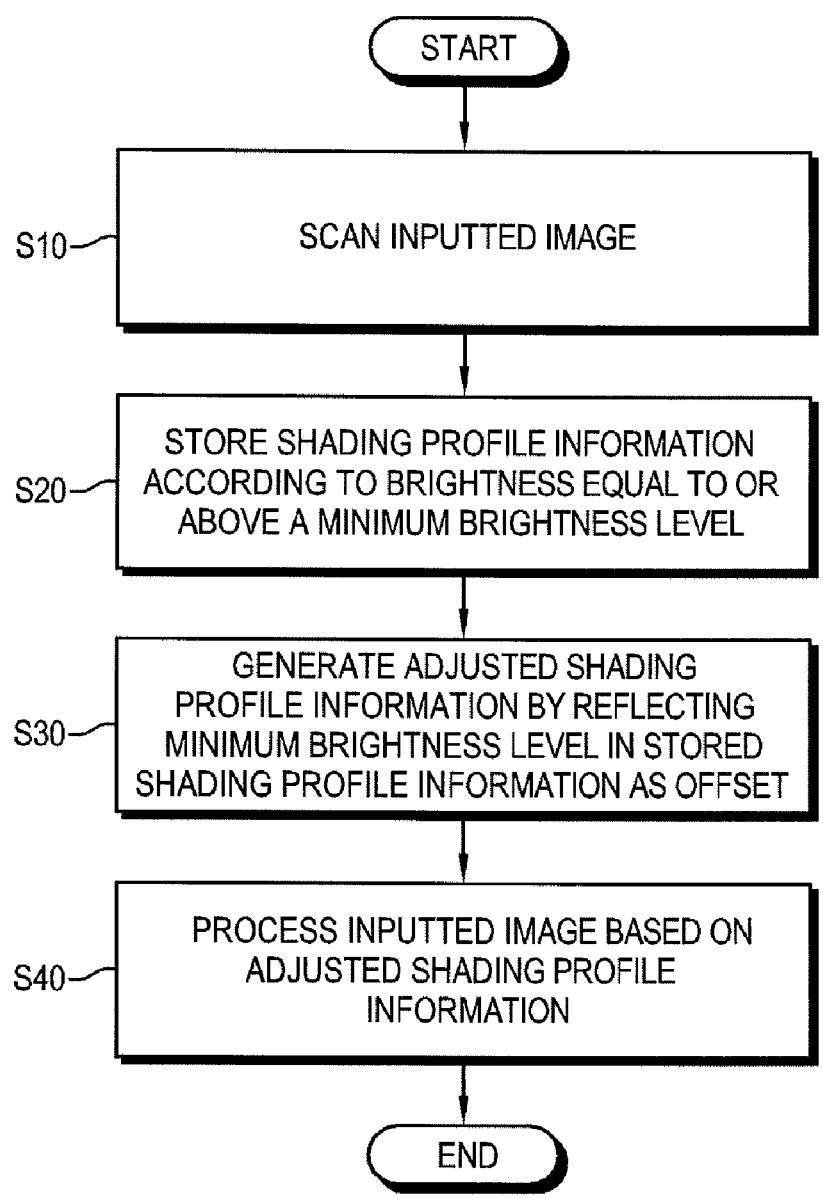
FIG. 5 is a flow chart illustrating an exemplary embodiment of a shading method of the image processing apparatus according to the present general inventive concept.

Hereinafter, an embodiment of a shading method according to the present general inventive concept will be described with reference to FIG. 5. The method embodiment of FIG. 5 can be used with and will be described using embodiments of FIG. 2, however, the method embodiment of FIG. 5 or the present general inventive concept is not intended to be limited thereby.

First, the controller 40 may scan the inputted image at operation S10. The controller 40 may determine the shading profile information according to brightness equal to or above the minimum brightness level at operation S20. The shading profile information according to brightness equal to or above the minimum brightness level may be stored (e.g., in the storage unit 20) at operation S20.

The controller 40 may separate and store the black shading profile information and the white shading profile information in the first storage unit 20a and the second storage unit 20b, respectively. The controller 40 may control to divide the inputted image to correspond to pixels, lines, regions or divide the lines into the preset plural regions to store the shading profile information corresponding thereto.

Then, the controller 40 may reflect the minimum brightness level to the stored shading profile information as the offset at operation S30. Further, the controller 40 may generate the adjusted shading profile information with respect to the shading profile information stored in the storage unit by reflecting the offset at operation S30. The controller may process the inputted image based on the adjusted shading profile information at operation S40. Thus, the capacity of the memory storing the shading information may be reduced.

Selected embodiments of the present general inventive concept were described using a controller and an image processor (e.g., controller 40 and image processor 30). Certain capabilities may be moved therebetween without departing from the principles and spirit of the general inventive concept. Further, alternative embodiments according to the present general inventive concept may combine the image processor 30 and the controller 40 to provide only a controller or only an image processor.

As described above, the present general inventive concept provides embodiments of an image processing apparatus and methods that may store shading profile information using a reduced memory or storage capacity. The present general inventive concept provides embodiments of image processing apparatuses and methods that may store shading profile information using a reduced memory or storage capacity according to a prescribed level of a characteristic of an image or apparatus (e.g., brightness equal to or above a minimum brightness level).

Also, the present general inventive concept provides an image processing apparatus that can differently store shading profile information (e.g., of a scanned inputted image) according to brightness and adjust shades of the image efficiently, and a shading method thereof.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents. As used in this disclosure, the term "preferably" is non-exclusive and means "preferably, but not limited to." Terms in the claims should be given their broadest interpretation consistent with the general inventive concept as set forth in this description. For example, the terms "coupled" and "connect" (and derivations thereof) are used to connote both direct and indirect connections/couplings. As another example, "having" and "including", derivatives thereof and similar transitional terms or phrases are used synonymously with "comprising" (i.e., all are considered "open ended" terms)—only the phrases "consisting of" and "consisting essentially of" should be considered as "close ended". Claims are not intended to be interpreted under 112 sixth paragraph unless the phrase "means for" and an associated function appear in a claim and the claim fails to recite sufficient structure to perform such function.

What is claimed is:

1. An image processing apparatus, comprising:
   a scanning unit to scan an inputted image;
   a storage unit;
   an image processor to process the inputted image; and
   a controller to store the shading profile information in the storage unit according to brightness equal to or above a minimum brightness level, to generate adjusted shading profile information by reflecting the minimum brightness level in the stored shading profile information as an offset, and to control the image processor to process the inputted image based on the adjusted shading profile information.

2. The image processing apparatus according to claim 1, wherein the storage unit comprises a first storage unit to store black shading profile information and a second storage unit to store white shading profile information.

3. The image processing apparatus according to claim 1, wherein the shading profile information is stored per line according to the brightness equal to or above a minimum brightness level.

4. The image processing apparatus according to claim 3, the controller to divide the line into a plurality of preset regions, and wherein the shading profile information is stored for each the plurality of regions according to the brightness equal to or above a minimum brightness level.

5. The image processing apparatus according to claim 1, wherein the shading profile information is stored according to RGB channels.

6. A shading method of an image processing apparatus, comprising:
   scanning an inputted image;
   storing shading profile information according to brightness equal to or above a minimum brightness level;
   generating adjusted shading profile information by incorporating the minimum brightness level in the stored shading profile information as an offset; and
   processing the inputted image based on the adjusted shading profile information.

7. The shading method according to claim 6, wherein the storing the shading profile information comprises respectively storing black shading profile information and white shading profile information.

8. The shading method according to claim 6, wherein the storing the shading profile information comprises storing the shading profile information per line.

9. The shading method according to claim 8, wherein the storing the shading profile information comprises dividing the line into a plurality of preset regions and storing the shading profile information of the plurality of regions according to brightness.

10. The shading method according to claim 6, wherein the storing the shading profile information comprises storing the shading profile information according to RGB channels.

11. An image processing apparatus, comprising:
    a scanning unit to scan an inputted image; and
    a controller to process the inputted image using adjusted shading profile information stored according to a prescribed non-zero brightness level.

12. The image processing apparatus according to claim 11, wherein the controller determines the adjusted shading profile information according to brightness level greater than a minimum brightness level.

13. The image processing apparatus according to claim 12, wherein the controller generates current shading profile information by incorporating the minimum brightness level in the adjusted shading profile information as an offset and processes the inputted image using the current shading profile information.

14. The image processing apparatus according to claim 13, wherein the controller processes input image data of the input image according to (ADCDATA-BLKSHDDATA)/(WHTSHDDATA-BLKSHDDATA), where ADCDATA is input image digital data, BLKSHDDATA is current black shading profile information and WHTSHDDATA is current white shading profile information.

15. The image processing apparatus according to claim 12, wherein the adjusted shading profile information is stored per pixel, pixels, line segment, line, lines, region or plurality of preset regions according to the brightness equal to or above a minimum brightness level.

16. The image processing apparatus according to claim 15, wherein the controller stores the adjusted shading profile information according to a plurality of colors.

17. The image processing apparatus according to claim 16, wherein the controller stores the adjusted shading profile information according to RGB channels.

18. The image processing apparatus according to claim 11, wherein the adjusted shading profile information is stored upon manufacture, assembly, certification, operation or testing of the image processing apparatus or component thereof.

19. The image processing apparatus according to claim 11, wherein the adjusted shading profile information is stored one time, repeatedly, periodically, according to user actions, based on receipt of a command, based on an external input, with upon receipt an initial input image, with each input image, based on conditions at the image processing apparatus or detected in images processed by the image processing apparatus.

20. The image processing apparatus according to claim 11, wherein the adjusted shading profile information is based on a reference image, a reference scan or a reference scan location.

21. The image processing apparatus according to claim 11, further comprising:
   a storage unit to store the adjusted shading profile information; and
   an image processor to process the inputted image.

22. The image processing apparatus according to claim 11, wherein the adjusted shading profile information comprises white shading profile information and black shading profile information, wherein the storage unit comprises a first storage unit to store the adjusted black shading profile information and a second storage unit to store the adjusted white shading profile information, and wherein the storage unit is a flash memory.

23. A shading method of an image processing apparatus, comprising:
   storing shading profile information according to a brightness relationship to a prescribed brightness level to reduce a storing capacity adapted to store the shading profile information.

24. A computer readable medium having stored thereon instructions for use with an image forming apparatus, the instructions comprising:
   first instructions for scanning an inputted image;
   second instructions for storing shading profile information according to a brightness level above a prescribed lower brightness level;
   third instructions for generating adjusted shading profile information by incorporating the prescribed lower brightness level in the stored shading profile information; and
   fourth instructions for processing the inputted image based on the adjusted shading profile information.

25. An image processing apparatus, comprising:
   a scanning unit to generate a scanned image;
   a controller that determines a brightness of the scanned image and that determines an offset brightness value based on the brightness of the scanned image when the brightness of the scanned image exceeds a predetermined brightness threshold and that generates an adjusted shading profile information based on the offset brightness value and that adjusts the brightness of the scanned image according to the adjusted shading profile information.

26. The image processing apparatus of claim 25, wherein the controller determines a white offset value based on the brightness of scanned image and a black offset value of the brightness of the scanned image and stores the white offset value in a white offset memory module when the brightness of the scanned image exceeds the predetermined threshold and stores the black offset value in a black offset memory module when the brightness exceeds the predetermined threshold.

* * * * *